(12) United States Patent
Sun et al.

(10) Patent No.: US 12,495,340 B2
(45) Date of Patent: Dec. 9, 2025

(54) HANDOVER METHOD AND DEVICE

(71) Applicant: DATANG MOBILE COMMUNICATIONS EQUIPMENT CO., LTD., Beijing (CN)

(72) Inventors: Jiancheng Sun, Beijing (CN); Ye Zhou, Beijing (CN); Dajun Zhang, Beijing (CN); Aijuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 475 days.

(21) Appl. No.: 18/013,888

(22) PCT Filed: May 13, 2021

(86) PCT No.: PCT/CN2021/093697
§ 371 (c)(1),
(2) Date: Dec. 29, 2022

(87) PCT Pub. No.: WO2022/001413
PCT Pub. Date: Jan. 6, 2022

(65) Prior Publication Data
US 2023/0308972 A1  Sep. 28, 2023

(30) Foreign Application Priority Data
Jul. 3, 2020 (CN) .......................... 202010637065.2

(51) Int. Cl.
*H04W 36/08* (2009.01)
*H04W 36/00* (2009.01)
(52) U.S. Cl.
CPC ....... *H04W 36/08* (2013.01); *H04W 36/0072* (2013.01); *H04W 36/00835* (2018.08)

(58) Field of Classification Search
CPC ............. H04W 36/08; H04W 36/0072; H04W 36/00835
See application file for complete search history.

(56) References Cited

U.S. PATENT DOCUMENTS

2018/0376380 A1  12/2018  Leroux
2019/0059027 A1   2/2019  Yang et al.

FOREIGN PATENT DOCUMENTS

CN    107027153 A    8/2017
CN    108668381 A   10/2018
(Continued)

OTHER PUBLICATIONS

3GPP TR 38.821 V16.0.0, 3rd Generation Partnership Project; Technical Specification Group Radio Access Network; Solutions for NR to support non-terrestrial networks (NTN) (Release 16), total 140 pages, Dec. 2019.
(Continued)

*Primary Examiner* — Myron Wyche
(74) *Attorney, Agent, or Firm* — KILPATRICK TOWNSEND & STOCKTON LLP

(57) ABSTRACT

Disclosed are a handover method and device. In embodiments of the present application, first, a DU determines that an inter-CU handover is required and then sends an F1 interface establishment request to a target CU, the F1 interface establishment request indicating that the reason for the establishment is the inter-CU handover for the DU; upon receiving the F1 interface establishment request sent from the DU, the target CU returns an F1 interface establishment response to the DU; upon receiving the F1 interface establishment response returned by the target CU, the DU sends to a source CU a message for instructing the DU to perform the inter-CU handover; and then, the DU is handed over from the source CU to the target CU.

20 Claims, 8 Drawing Sheets

(56) References Cited

FOREIGN PATENT DOCUMENTS

| CN | 109756942 A | 5/2019 | |
|---|---|---|---|
| CN | 110798901 A | 2/2020 | |
| CN | 110972143 A | 4/2020 | |
| CN | 111093286 A | 5/2020 | |
| WO | 2019246446 A1 | 12/2019 | |
| WO | WO2019246446 | * 12/2019 | ........ H04W 36/0055 |
| WO | 2020003929 A1 | 1/2020 | |

OTHER PUBLICATIONS

Nokia et al., "Discussion on feeder link switch for regenerative & transparent NTN LEO scenarios", 3GPP TSG-RAN WG2 Meeting #106, Prague, Czech Republic, Aug. 26-30, 2019, total 12 pages, R2-1910698.

Nokia et al., "Analysis on mobilitry due to interface change", 3GPP TSG-RAN WG3 #103bis, Xi'an, China, Apr. 8-12, 2019, total 5 pages, R3-191545.

* cited by examiner

HANDOVER METHOD AND DEVICE

CROSS REFERENCE TO RELATED APPLICATIONS

The present disclosure is a National Stage of International Application No. PCT/CN2021/093697 filed May 13, 2021, which claims the priority to Chinese Patent Application No. 202010637065.2, filed to the Chinese Patent Office on Jul. 3, 2020 and entitled "HANDOVER METHOD AND DEVICE", which is incorporated in its entirety herein by reference.

FIELD

The embodiments of the present disclosure relate to the field of radio communications, and in particular to handover methods and devices.

BACKGROUND

Owing to the fusion of low earth orbit satellites and 5th generation (5G) mobile communication as well as 6th generation (6G) mobile communication and the introduction of the integrated access and backhaul (IAB) technology, the network deployment becomes increasingly flexible. For example, if the next generation node B (gNB (base station))-distributed unit (DU) nodes are deployed in trains, airplanes, ships, etc., to provide network services for their internal user equipments (UEs), it is unnecessary to connect or hand over each UE to satellites or ground base stations or in real time.

However, under a central unit (CU)-DU separated network architecture, a complete solution to handover of a DU between CUs is still unavailable yet.

SUMMARY

Embodiments of the present disclosure provide handover methods and devices, to solve the problem of how to hand a distributed unit (DU) over between central units (CUs) under a CU-DU separated network architecture in the related art.

In view of the problem described above, in one embodiment of the present disclosure provides a handover method. The method includes: a DU determining that an inter CU handover is required and sending an F1 interface establishment request to a target CU, where the F1 interface establishment request indicates that an establishment cause is the inter CU handover performed by the DU; upon receiving an F1 interface establishment response returned by the target CU, the DU sending a message for instructing the DU to perform the inter CU handover to a source CU; and handing, by the DU, the DU over from the source CU to the target CU.

In a possible implementation mode, the DU determining that the inter CU handover is required includes: the DU determining that the inter CU handover is required according to a received handover request sent by the source CU; or the DU determining that the inter CU handover is required in response to satisfying a first handover triggering condition.

In a possible implementation mode, the handover request carries information of the target CU; and after the DU determining that the inter CU handover is required according to the handover request, and before the DU sending the F1 interface establishment request to the target CU, the method further includes: the DU obtaining the information of the target CU from the handover request sent by the source CU.

In a possible implementation mode, after the DU determining that the inter CU handover is required in response to satisfying the first handover triggering condition, and before the DU sending the F1 interface establishment request to the target CU, the method further includes: the DU determining information of the target CU on the basis of pre-configuration information.

In a possible implementation mode, the DU sending a message for instructing the DU to perform the inter CU handover to the source CU includes: the DU sending a handover response message for instructing the DU to perform the inter CU handover to the source CU; or the DU sending a handover instruction message for instructing the DU to perform the inter CU handover to the source CU.

In a possible implementation mode, the handing, by the DU, the DU over from the source CU to the target CU includes: the DU receiving a user equipment (UE) context establishment request sent by the target CU, and a UE context modification request and a radio resource control (RRC) reconfiguration message sent by the source CU, where a UE is a UE accessing the DU; the DU sending the RRC reconfiguration message to the UE; and upon receiving an RRC reconfiguration completion message returned by the UE, the DU sending the RRC reconfiguration completion message to the target CU, to enable the target CU to send a path handover request to a core network.

In a possible implementation mode, the information of the target CU includes at least one of the following: an identity (ID) of the target CU; a name of the target CU; an address of a transport network layer (TNL) of the target CU; or configuration information of operation administration and maintenance (OAM) of the DU.

In a possible implementation mode, after the DU receiving a UE context modification request sent by the source CU, the method further includes: the DU releasing a UE context at the source CU.

In a possible implementation mode, the F1 interface establishment request is transmitted through at least one of the following: an RRC connection between a specific UE of the DU and the target CU; a laser link between the DU and the target CU; a microwave link between the DU and the target CU; or a wired connection between the DU and the target CU.

In one embodiment of the present disclosure provides a handover method. The method includes: a source CU receiving a message for instructing the DU to perform an inter CU handover sent by a DU, to hand the DU over from a source CU to a target CU.

In a possible implementation mode, the source CU receiving the message for instructing the DU to perform an inter CU handover sent by the DU, includes: the source CU receiving a handover response message for instructing the DU to perform the inter CU handover sent by the DU; or the source CU receiving a handover instruction message for instructing the DU to perform the inter CU handover sent by the DU.

In a possible implementation mode, before the source CU receiving the handover response message for instructing the DU to perform the inter CU handover sent by the DU, the method further includes: the source CU determining that the DU is required to perform the inter CU handover in response to satisfying a second handover triggering condition; and the source CU sending a handover request to the DU, to enable the DU to determine that the inter CU handover is required.

In a possible implementation mode, after the source CU receiving the message for instructing the DU to perform the inter CU handover sent by a DU, the method further includes: the source CU sending a handover request for applying for resources for a UE to the target CU, where the UE is a UE accessing the DU; and upon receiving a handover request acknowledgement message returned by the target CU, the source CU sending a UE context modification request and an RRC reconfiguration message to the DU, to enable the DU to perform UE context modification and trigger the UE to perform RRC reconfiguration.

In one embodiment of the present disclosure provides a handover method. The method includes: a target CU receiving an F1 interface establishment request sent by a DU, where the F1 interface establishment request indicates that an establishment cause is an inter CU handover performed by the DU; and the target CU returning an F1 interface establishment response to the DU, to hand the DU over from a source CU to the target CU.

In a possible implementation mode, after the target CU returning the F1 interface establishment response to the DU, the method further includes: the target CU receiving a handover request for applying for resources for a UE, sent by the source CU, where the UE is a UE accessing the DU; the target CU sending a UE context establishment request to the DU and a handover request acknowledgement message to the source CU, to enable the DU to notify the UE of performing RRC reconfiguration; upon receiving an RRC reconfiguration completion message sent by the DU, the target CU sending a path handover request to a core network; and the target CU receiving a path handover request acknowledgement message returned by the core network.

In a possible implementation mode, the F1 interface establishment request is transmitted through at least one of the following: an RRC connection between a specific UE of the DU and the target CU; a laser link between the DU and the target CU; a microwave link between the DU and the target CU; or a wired connection between the DU and the target CU.

In one embodiment of the present disclosure provides a DU for a handover. The DU includes: a processor, a memory, and a transceiver, where the processor is configured for reading programs in the memory, and executing: determining that an inter CU handover is required and sending an F1 interface establishment request to a target CU, where the F1 interface establishment request indicates that an establishment cause is the inter CU handover performed by the DU; upon receiving an F1 interface establishment response returned by the target CU, sending a message for instructing the DU to perform the inter CU handover, to a source CU; and handing the DU over from the source CU to the target CU.

In a possible implementation mode, the processor is further configured for: determining that the inter CU handover is required according to a received handover request sent by the source CU; or determining that the inter CU handover is required in response to satisfying a first handover triggering condition.

In a possible implementation mode, the handover request carries information of the target CU; and the processor is further configured for: after the determining that the inter CU handover is required according to the handover request, and before the sending an F1 interface establishment request to the target CU, obtaining the information of the target CU from the handover request sent by the source CU.

In a possible implementation mode, the processor is further configured for: after the determining that the inter CU handover is required in response to satisfying the first handover triggering condition, and before the sending the F1 interface establishment request to the target CU, determining information of the target CU on the basis of pre-configuration information.

In a possible implementation mode, the processor is further configured for: sending a handover response message for instructing the DU to perform the inter CU handover to the source CU; or sending a handover instruction message for instructing the DU to perform the inter CU handover to the source CU.

In a possible implementation mode, the processor is further configured for: receiving a UE context establishment request sent by the target CU, and a UE context modification request and an RRC reconfiguration message sent by the source CU, where the UE is a UE accessing the DU; sending the RRC reconfiguration message to the UE; and upon receiving an RRC reconfiguration completion message returned by the UE, sending the RRC reconfiguration completion message to the target CU, to enable the target CU to send a path handover request to a core network.

In a possible implementation mode, the information of the target CU includes at least one of the following: an ID of the target CU; a name of the target CU; an address of a TNL of the target CU; or configuration information of OAM of the DU.

In a possible implementation mode, the processor is further configured for: after receiving a UE context modification request sent by the source CU, releasing a UE context at the source CU.

In a possible implementation mode, the F1 interface establishment request is transmitted through at least one of the following: an RRC connection between a specific UE of the DU and the target CU; a laser link between the DU and the target CU; a microwave link between the DU and the target CU; or a wired connection between the DU and the target CU.

In one embodiment of the present disclosure provides a source CU for a handover. The source CU includes: a processor, a memory, and a transceiver, where the processor is configured for reading programs in the memory, and executing: receiving a message for instructing a DU to perform an inter CU handover sent by the DU to hand the DU over from a source CU to a target CU.

In a possible implementation mode, the processor is further configured for: receiving a handover response message for instructing the DU to perform the inter CU handover sent by the DU; or receiving a handover instruction message for instructing the DU to perform the inter CU handover sent by the DU.

In a possible implementation mode, the processor is further configured for: before the receiving the handover response message for instructing the DU to perform the inter CU handover sent by the DU, determining that the DU is required to perform the inter CU handover in response to satisfying a second handover triggering condition; and sending a handover request to the DU, to enable the DU to determine that the inter CU handover is required.

In a possible implementation mode, the processor is further configured for: after the receiving the message for instructing the DU to perform the inter CU handover sent by the DU, sending a handover request for applying for resources for a UE to the target CU, where the UE is a UE accessing the DU; and upon receiving a handover request acknowledgement message returned by the target CU, sending a UE context modification request and an RRC reconfiguration message to the DU, to enable the DU to perform UE context modification and trigger the UE to perform RRC reconfiguration.

In one embodiment of the present disclosure provides a target CU for a handover. The target CU includes a processor, a memory and a transceiver, where the processor is configured for reading programs in the memory, and executing: receiving an F1 interface establishment request sent by a DU, where the F1 interface establishment request indicates that an establishment cause is an inter CU handover performed by the DU; and returning an F1 interface establishment response to the DU, to hand the DU over from a source CU to the target CU.

In a possible implementation mode, the processor is further configured for: after the returning the F1 interface establishment response to the DU, receiving a handover request for applying for resources for a UE sent by the source CU, where the UE is a UE accessing the DU; sending a UE context establishment request to the DU and a handover request acknowledgement message to the source CU, to enable the DU to notify the UE of performing RRC reconfiguration; upon receiving an RRC reconfiguration completion message sent by the DU, sending a path handover request to a core network; and receiving a path handover request acknowledgement message returned by the core network.

In a possible implementation mode, the F1 interface establishment request is transmitted through at least one of the following: an RRC connection between a specific UE of the DU and the target CU; a laser link between the DU and the target CU; a microwave link between the DU and the target CU; or a wired connection between the DU and the target CU.

In one embodiment of the present disclosure provides a DU for a handover. The DU includes: a sending device for determining that an inter CU handover is required and sending an F1 interface establishment request to a target CU, where the F1 interface establishment request indicates that an establishment cause is the inter CU handover performed by the DU; a processing device for upon receiving an F1 interface establishment response returned by the target CU, sending a message for instructing the DU to perform the inter CU handover to a source CU; and a handover device for handing the DU over from the source CU to the target CU.

In one embodiment of the present disclosure provides a source CU for a handover. The source CU includes: a first receiving device for receiving a message for instructing a DU to perform an inter CU handover sent by a DU, to hand the DU over from a source CU to a target CU.

In one embodiment of the present disclosure provides a target CU for a handover. The target CU includes: a second receiving device for receiving an F1 interface establishment request sent by a DU, where the F1 interface establishment request indicates that an establishment cause is an inter CU handover performed by the DU; and a returning device for returning an F1 interface establishment response to the DU, to hand the DU over from a source CU to the target CU.

In one embodiment of the present disclosure provides a computer storable medium, storing computer programs, where the computer programs are executed by a processor to perform the method in the embodiments.

In the embodiments of the present disclosure, the DU determines that the inter CU handover is required at first and then sends the F1 interface establishment request to the target CU, where the F1 interface establishment request indicates that the establishment cause is the inter CU handover performed by the DU; upon receiving the F1 interface establishment request sent by the DU, the target CU returns an F1 interface establishment response to the DU; upon receiving the F1 interface establishment response returned by the target CU, the DU sends the message for instructing the DU to perform the inter CU handover to the source CU; and then the DU is handed over from the source CU to the target CU. According to the method described above, the DU may be handed over from the source CU to the target CU, and under a CU-DU separated network architecture, the DU may be handed over from the source CU to the target CU flexibly, when it is impossible for the source CU to provide a network service for the DU, the DU is handed over to the target CU that may provide a network service for the DU, to improve a communication quality of a UE served by the DU.

BRIEF DESCRIPTION OF THE DRAWINGS

To describe the embodiments of the present disclosure more clearly, the accompanying drawings for describing the embodiments are briefly described below. The accompanying drawings in the following description show merely some embodiments of the present disclosure, and other embodiments can be obtained by the accompanying drawings.

DETAILED DESCRIPTION OF THE EMBODIMENTS

Embodiments of the present disclosure will be further described in detail below with reference to the accompanying drawings. The described embodiments are merely some rather than all of the embodiments of the present disclosure.

In the embodiments of the present disclosure, "B is determined according to A" does not mean that B is determined only according to A, but may mean that B is determined according to A and other information. "A includes B" does not mean that A only includes B, but means that A may also include other information, such as C and D.

In the embodiments of the present disclosure, "exemplary" is used for meaning an example, illustration or explanation. Any embodiment or design solution described as an "example" in the present disclosure should not be interpreted as being more preferred or advantageous than other embodiments or design solutions. To be exact, "example" is used for presenting a concept in a concrete way.

The network architecture and service scenario described in the embodiments of the present disclosure are intended to describe the embodiments of the present disclosure more clearly, instead of limiting the embodiments of the present disclosure. With evolution of the network architecture and emergence of new business scenarios, the embodiments of the present disclosure is also applicable to similar problems.

To facilitate understanding of the embodiments of the present disclosure, a scenario applicable to the embodiments of the present disclosure will be described at first.

Figure 1:
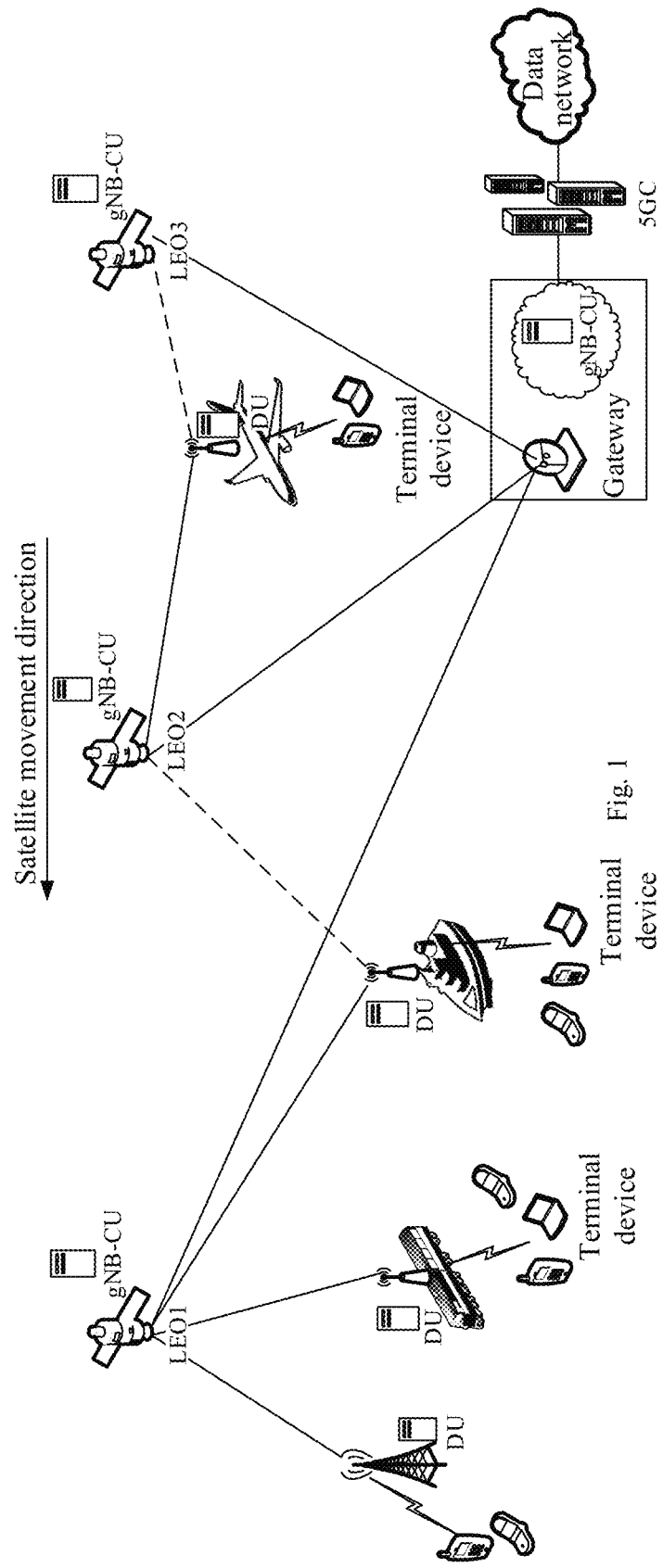
FIG. 1 is a schematic scenario diagram showing that an orbiting satellite provides centralized services for an airplane, a ship, a train, etc.

FIG. 1 is a schematic scenario diagram of an orbiting satellite providing centralized services for an airplane, a ship, a train, etc. In FIG. 1, the satellite carries a gNB-CU, and some portable devices on the ground, the ocean, and the airplane can access the satellite through a tower, a vehicle, a ship, and, an airborne gNB-DU node to obtain network services, and not all the portable devices are required to have the satellite access capacity. The vehicle, the ship, the aircraft, etc. carry DUs, which are connected with the CUs of the satellite to provide the corresponding network services. In this scenario, the low earth orbit (LEO) moves rapidly, in order to ensure that the portable device accessing the DU can communicate normally, the DU is required to be frequently handed over among multiple satellites (i.e. CUs), with UE served by the DU being handed over as well.

Figure 2:
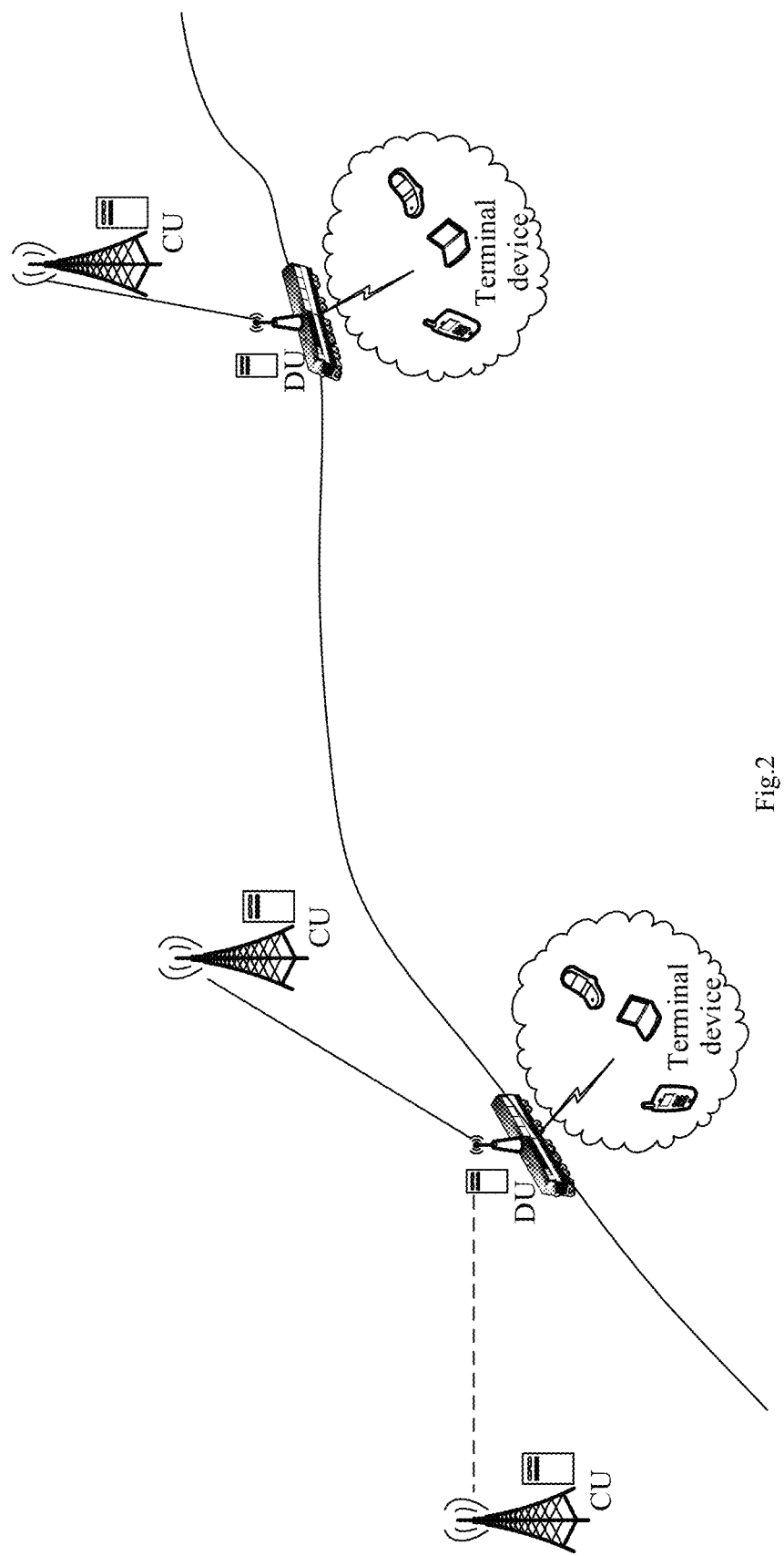
FIG. 2 is a schematic scenario diagram showing that signal towers deployed on the ground provide centralized services for trains.

FIG. 2 is a schematic scenario diagram of signal towers deployed on the ground providing centralized services for trains. In FIG. 2, the signal towers (i.e. CUs) are deployed on the ground, and DUs are deployed on moving trains. The DUs deployed on the trains can provide stable signals and services for passengers. However, as the trains move, in order to provide stable signals and services for passengers on the trains, the trains are required to be handed over constantly between the signal towers (i.e. CUs) on the ground.

Figure 3:
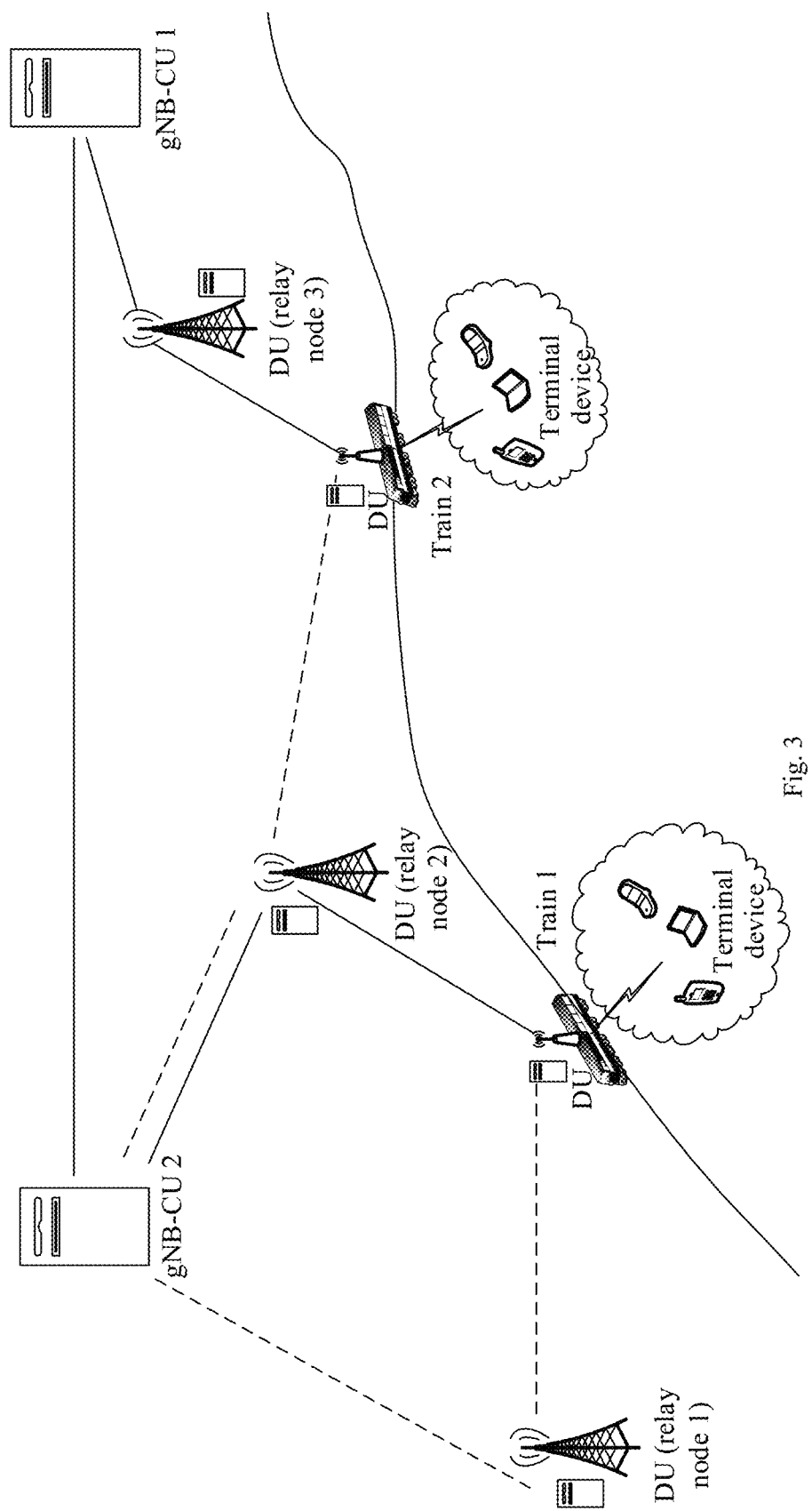
FIG. 3 is another schematic scenario diagram showing that signal towers deployed on the ground provide centralized services for trains.

FIG. 3 is another schematic scenario diagram of signal towers deployed on the ground providing centralized services for trains. In FIG. 3, the signal towers deployed on the ground are some relay nodes, and CUs are at relatively distal ends. After connected with the CUs through the relay nodes (the signal towers), DUs deployed on the trains provide network services for UEs served by the DUs. As the trains move, the DUs deployed on the trains will be handed over between the relay nodes, which may be within the same gNB-CU or across different gNB-CUs. As shown in FIG. 3, train 2 is currently connected with gNB-CU 1 through relay node 3. During a handover, train 2 may be connected with gNB-CU 2 through relay node 2 to continue to provide a service for the UE thereof.

It can be seen from the scenario described above that under a CU-DU separated network architecture, it is necessary to provide a feasible solution for handing a DU over between CUs.

Figure 4:
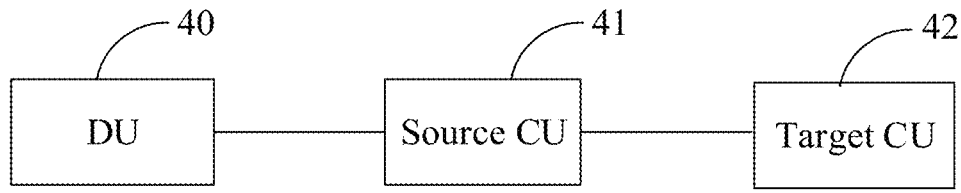
FIG. 4 is a schematic system diagram of a handover method provided in an embodiment of the present disclosure.

On the basis of the problem described above, as shown in FIG. 4, an embodiment of the present disclosure provides a system for a handover method. The system includes: DU 40, source CU 41, and target CU 42.

DU 40 determines that an inter CU handover is required and sends an F1 interface establishment request to the target CU, where the F1 interface establishment request indicates that an establishment cause is the inter CU handover performed by the DU; upon receiving an F1 interface establishment response returned by the target CU, the DU sends a message for instructing the DU to perform the inter CU handover to the source CU; and the DU is handed over from the source CU to the target CU.

Source CU 41 receives a message sent by the DU and used for instructing the DU to perform the inter CU handover, to hand the DU over from the source CU to the target CU.

Target CU 42 receives the F1 interface establishment request sent by the DU, where the F1 interface establishment request indicates that the establishment cause is the inter CU handover performed on the DU; and the target CU returns an F1 interface establishment response to the DU, to hand the DU over from the source CU to the target CU.

In the embodiments of the present disclosure, the DU determines that the inter CU handover is required at first and then sends the F1 interface establishment request to the target CU, the F1 interface establishment request indicating that the establishment cause is the inter CU handover performed on the DU; upon receiving the F1 interface establishment request sent from the DU, the target CU returns the F1 interface establishment response to the DU; upon receiving the F1 interface establishment response returned by the target CU, the DU sends the message for instructing the DU to perform the inter CU handover to the source CU; and then the DU is handed over from the source CU to the target CU. According to the method described above, the DU may be handed over from the source CU to the target CU, and under the CU-DU separated network architecture, the DU may be handed over from the source CU to the target CU flexibly, when it is impossible for the source CU to provide a network service for the DU, the DU is handed over to the target CU that may provide a network services for the DU, to improve a communication quality of a UE served by the DU.

An F1 interface may be established through wired transmission, such as a network cable or an optical fiber, or through wireless transmission, such as a radio resource control (RRC) connection between a specific UE of the DU and the target CU, a laser link between the DU and the target CU, and a microwave link between the DU and the target CU.

It should be noted that the specific UE of the DU herein is a UE having an RRC connection with the target CU, such as a mobile terminal (MT) in an integrated access and backhaul (IAB) network.

Establishing the F1 interface through the RRC connection between the specific UE of the DU and the target CU is described below.

For example, the mobile DU is connected with a specific UE (the mobile DU and the specific UE are deployed together, such as on the same physical device, or deployed close to each other through a wired connection). Each CU is connected with one specific DU (the CU and the specific DU may be deployed together, such as on the same physical device, or deployed close to each other through a wired connection on two different physical devices).

The specific UE may reside on the specific DU connected with the CU to measure and report a signal of the mobile DU. The RRC connection between the UE and the CU may serve as a carrier for the F1 interface between the mobile DU and the CU.

In a scenario with the DU moving, the specific UE of the DU may be handed over to the target CU at first, and then F1 establishment between the DU and the target CU and subsequent F1 signaling are carried through the RRC connection between the specific UE and the target CU.

In a specific implementation, the DU determines that the inter CU handover is required, which may be implemented in the following two methods, and the two methods will be described in detail below.

Method 1: the DU determines that the inter CU handover is required according to a received handover request sent by the source CU.

In method 1, the source CU initiates the handover. Specifically, the source CU determines whether a triggering condition is satisfied, if the handover triggering condition is satisfied, the source CU sends the handover request to the DU, and upon receiving the handover request sent by the source CU, the DU determines that the inter CU handover is required.

The handover triggering condition described above may be pre-configuration information, such as a time and a position, a radio resource management (RRM) measurement result from the DU, or a load balance of the CU.

For example, in the pre-configuration information, at a moment, the DU served by the source CU is required to be handed over to the target CU, and the source CU sends the handover request to the DU. When the DU deployed on the train arrives at each station, the CU is handed over to a CU corresponding to the station.

For another example, the mobile DU is connected with a specific UE (the mobile DU and the specific UE are deployed together, such as on the same physical device, or deployed close to each other through a wired connection). Each CU is connected with one specific DU. The CU and the specific DU may be deployed together, such as on the same physical device, or deployed close to each other through a wired connection on two different physical devices. The specific UE may reside on the specific DU connected with the CU and perform RRM measurement and report on the signal of the mobile DU. The source CU determines whether to hand the mobile DU over to the target CU according to information reported by the UE. In one embodiment, if the RRM measurement result is not within a preset range, the source CU sends the handover request to the mobile DU.

For another example, if determining that load balance thereof exceeds a preset range, the source CU sends the handover request to the DU, to hand the DU over to a CU having load balance within the preset range.

In this manner, after determining that the DU is required to perform the inter CU handover, the DU is also required to know which CU to hand over to, that is, the target CU. In one embodiment, the handover request sent by the source CU may carry information of the target CU, for example, an identity (ID) of the target CU; a name of the target CU; an address of a transport network layer (TNL) of the target CU; and configuration information of operation administration and maintenance (OAM) of the DU.

It should be noted that the configuration information of OAM of the DU herein may include a frequency point, a physical cell identity (PCI), a global cell ID (CGI), etc. when the DU is connected with the target CU.

Accordingly, upon receiving the handover request carrying the information of the target CU sent by the source CU, the DU may obtain the information of the target CU from the handover request, to determine the target CU.

Upon determining the target CU, the DU may send a handover response message for instructing the DU to perform the inter CU handover to the source CU to notify the source CU that the handover may be performed.

Method 2, the DU determines that the inter CU handover is required in response to satisfying the handover triggering condition.

In method 2, the DU initiates the handover. Specifically, the DU determines whether the handover triggering condition is satisfied, and if the handover triggering condition is satisfied, the DU determines that the inter CU handover is required.

The handover triggering condition described above may be pre-configuration information, such as a time and a position, or an RRM measurement result from the DU, or the DU decides to be handed over to the target CU.

For example, upon moving to a position, the DU determines that the inter CU handover is required according to a corresponding relation between a pre-configured position and the target CU.

For another example, if the RRM measurement result of the DU is not within the preset range, determine that the inter CU handover is required.

Upon determining that the inter CU handover is required, the DU is also required to determine the target CU to be handed over to. The DU may determine the information of the target CU through pre-configuration information, such as an ID of the target CU; a name of the target CU; an address of a TNL of the target CU; and configuration information of OAM of the DU.

Upon determining the target CU, the DU may send a handover instruction message for instructing the DU to perform the inter CU handover to the source CU to notify the source CU that the handover may be performed.

In the two methods described above, upon receiving the handover response message or the handover instruction message sent by the DU, the source CU sends the handover request to the target CU, the handover request being used for applying for resources for the UE served by the DU, and the resource including UE context transfer. In addition, the handover request may further carry a cause value or an identifier bit which is used for indicating that a handover reason is a handover on the DU.

Correspondingly, upon receiving the handover request sent by the source CU, the target CU sends a UE context establishment process to the DU, and the target CU returns a handover request acknowledgement (ACK) message to the source CU which is used for notifying the source CU that the handover may be performed. Upon receiving the handover request ACK message returned by the target CU, the source CU sends a UE context modification request to the DU.

Upon receiving the UE context establishment process sent by the target CU and the UE context modification request and an RRC reconfiguration message sent by the source CU, the DU sends the RRC reconfiguration message to the UE served by the DU. Upon completing an RRC reconfiguration process, the UE returns an RRC reconfiguration completion message to the DU, and the DU sends the RRC reconfiguration completion message to the target CU. Upon receiving the reconfiguration completion message sent by the DU, the target CU sends a path handover request to a core network, and the core network returns a path handover request acknowledgement message to the target CU. Upon receiving the path handover request acknowledgement message returned by the core network, the DU is handed over from the source CU to the target CU.

It should be noted that during a handover process from the source CU to the target CU, the DU may release a UE context at the source CU. For example, upon receiving the UE context modification request sent by the source CU, the DU releases the UE context at the source CU.

In addition, upon being handed over from the source CU to the target CU, the DU releases the UE context at the source CU. For example, upon receiving a path handover request acknowledgement returned by the core network, the target CU initiates a UE context release message to the source CU, and the source CU initiates the UE context release message to the DU. Upon receiving the UE context release message sent by the source CU, the DU releases the UE context at the source CU.

Next, the handover method of the present disclosure is further described through specific embodiments.

Embodiment 1

Figure 5:
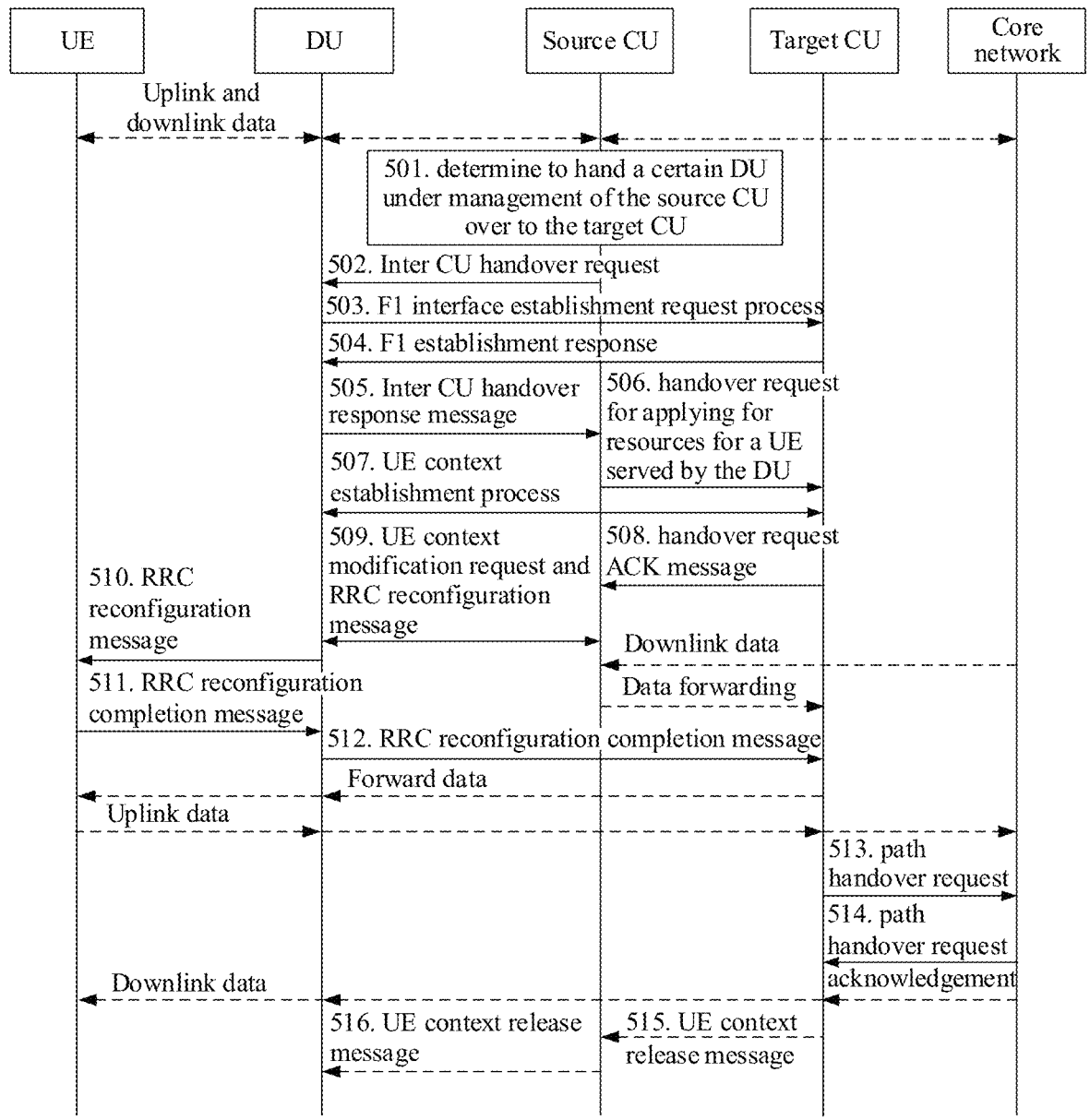
FIG. 5 is a schematic flowchart of a complete method for handing a DU over between CUs as provided in an embodiment of the present disclosure.

FIG. 5 shows a schematic flowchart of a complete method for a DU to be handed over between CUs provided in an embodiment of the present disclosure.

Step 501, a source CU determines to hand a DU under its management over to a target CU.

A handover triggering condition may be any condition based on a time, a position, RRM measurement, load information of the CU or DU, etc.

Step 502, the source CU sends an inter CU handover request message to the DU.

The message may carry some or all of the following information: an ID of the target CU (gNB ID), a name of the target CU, an address of a TNL of the target CU, or configuration information of OAM of the DU.

It should be noted that the configuration information of OAM of the DU herein may include a frequency point, a PCI, a CGI, etc. when the DU is connected with the target CU.

Step 503, the DU initiates an F1 interface establishment request to the target CU.

The F1 interface establishment request indicates that an establishment cause is a handover on the DU. In one embodiment, the request carries information such as the number of UEs currently served by the DU and a total throughput, etc.

Step 504, the target CU returns an F1 interface establishment response to the DU.

Step 505, the DU returns an inter CU handover response message to the source CU.

The message may carry a current serving cell list and a target CGI corresponding to each cell.

Step 506, the source CU sends a handover request to the target CU.

The handover request applies for resources (including UE context transfer) for all UEs served by the DU, and may carry a cause value or an identifier bit indicating that a handover reason is the handover on the DU.

Step 507, the target CU initiates a UE context establishment process to the DU.

Step 508, the target CU returns a handover request ACK message to the source CU.

Step 509, the source CU sends a UE context modification request and an RRC reconfiguration message to the DU.

A handover instruction for the UE is transmitted to the DU via the UE context modification request to instruct the DU to stop sending data.

Step 510, the DU sends an RRC reconfiguration message to the UE.

Step 511, the UE completes an RRC reconfiguration process and returns a completion message to the DU.

Step 512, the DU sends an RRC reconfiguration completion message to the target CU.

Step 513, the target CU initiates a path handover request to a core network.

Step 514, the core network returns a path handover request acknowledgement.

Step 515, the target CU initiates a UE context release message to the source CU.

Step 516, the source CU initiates the UE context release message to the DU.

It should be noted that steps 515 and 516 may be omitted. After step 509, the source CU and the DU may delete a UE context at a source CU side. The method may save on signaling overhead.

Embodiment 2

Figure 6:
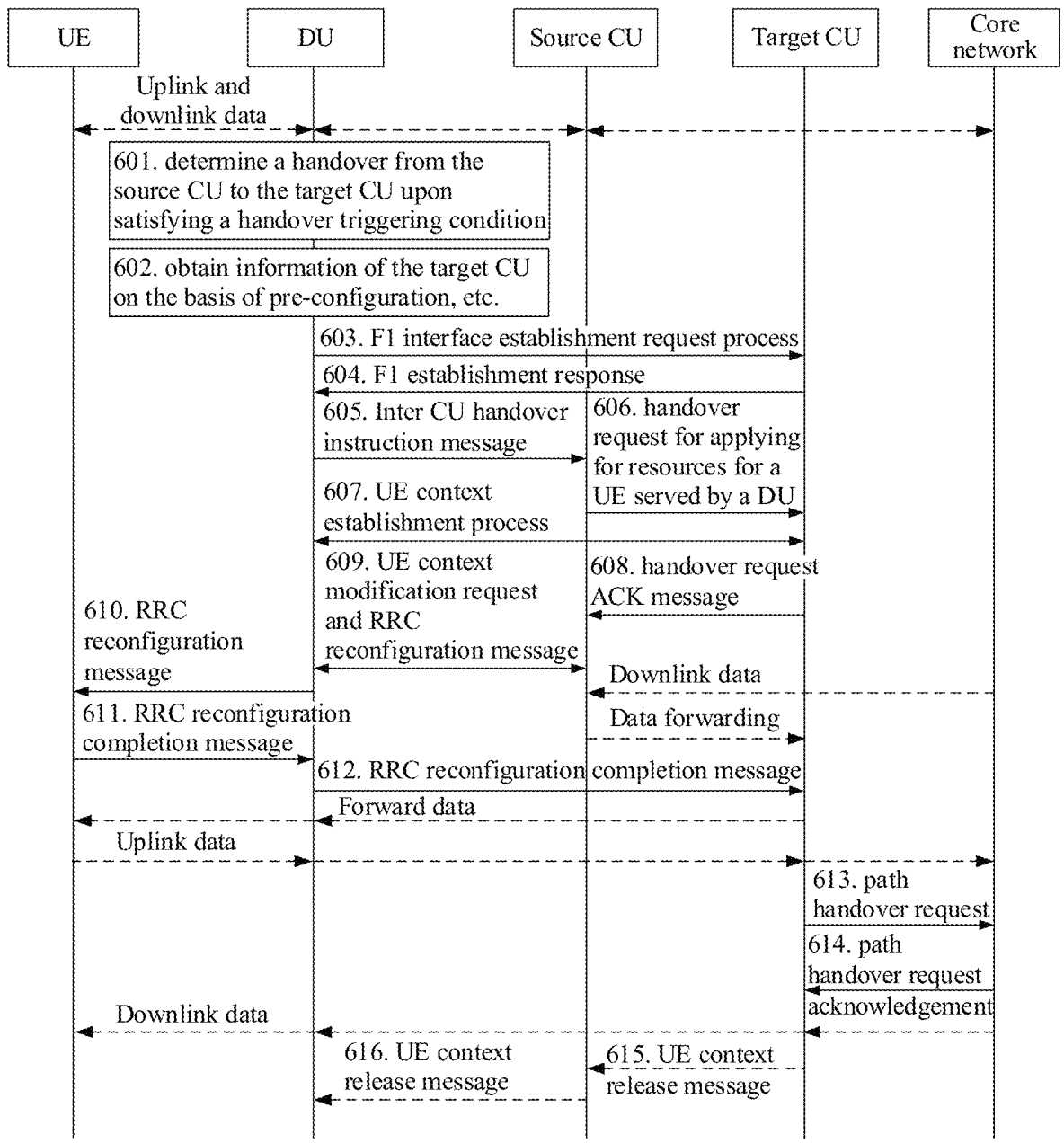
FIG. 6 is a schematic flowchart of another complete method for handing a DU over between CUs as provided in an embodiment of the present disclosure.

FIG. 6 shows a schematic flowchart of another complete method for a DU to be handed over between CUs provided in an embodiment of the present disclosure.

Step 601, upon satisfying a handover triggering condition, the DU determines to be handed over from a source CU to a target CU.

The handover triggering condition may be any condition based on a time, a position, RRM measurement, load information of the CU or DU, etc.

Step 602, the DU obtains information of the target CU on the basis of pre-configuration, etc.

The information of the target CU may include part or all of the following: an ID of the target CU (such as gNB ID), a name of the target CU, an address of a TNL of the target CU, or configuration information of OAM of the DU.

It should be noted that the configuration information of OAM of the DU herein may include a frequency point, a PCI, a CGI, etc. when the DU is connected with the target CU.

Step 603, the DU initiates an F1 interface establishment request to the target CU.

The F1 interface establishment request indicates that an establishment cause is a handover on the DU. In one embodiment, the request carries information such as the number of UEs currently served by the DU and a total throughput.

Step 604, the target CU returns an F1 interface establishment response to the DU.

Step 605, the DU sends an inter CU handover instruction message to the source CU.

The handover instruction message may carry the ID of the target CU, a current serving cell list, and a target CGI corresponding to each cell.

Step 606, the source CU sends a handover request to the target CU.

The handover request applies for resources (including UE context transfer) for all UEs served by the DU, and may carry a cause value or an identifier bit indicating that a handover reason is the handover on the DU.

Step 607, the target CU initiates a UE context establishment process to the DU.

Step 608, the target CU returns a handover request ACK message to the source CU.

Step 609, the source CU sends a UE context modification request and an RRC reconfiguration message to the DU.

A handover instruction for the UE is transmitted to the DU via the UE context modification request transmits to instruct the DU to stop sending data.

Step 610, the DU sends the RRC reconfiguration message to the UE.

Step 611, the UE completes an RRC reconfiguration process and returns a completion message to the DU.

Step 612, the DU sends the RRC reconfiguration completion message to the target CU.

Step 613, the target CU initiates a path handover request to a core network.

Step 614, the core network returns a path handover request acknowledgement.

Step 615, the target CU initiates a UE context release message to the source CU.

Step 616, the source CU initiates the UE context release message to the DU.

It should be noted that steps 615 and 616 may be omitted. After step 609, the source CU and the DU may delete a UE context, at a source CU side. The method may save on signaling overhead.

An embodiment of the present disclosure further provides a handover method. Since a DU corresponding to the method is the DU in the handover system in the embodiment of the present disclosure, and a principle of the method to solve problems is similar to that of the DU, implementation of the method may refer to implementation of the system, and repetitions are not repeated herein.

Figure 7:
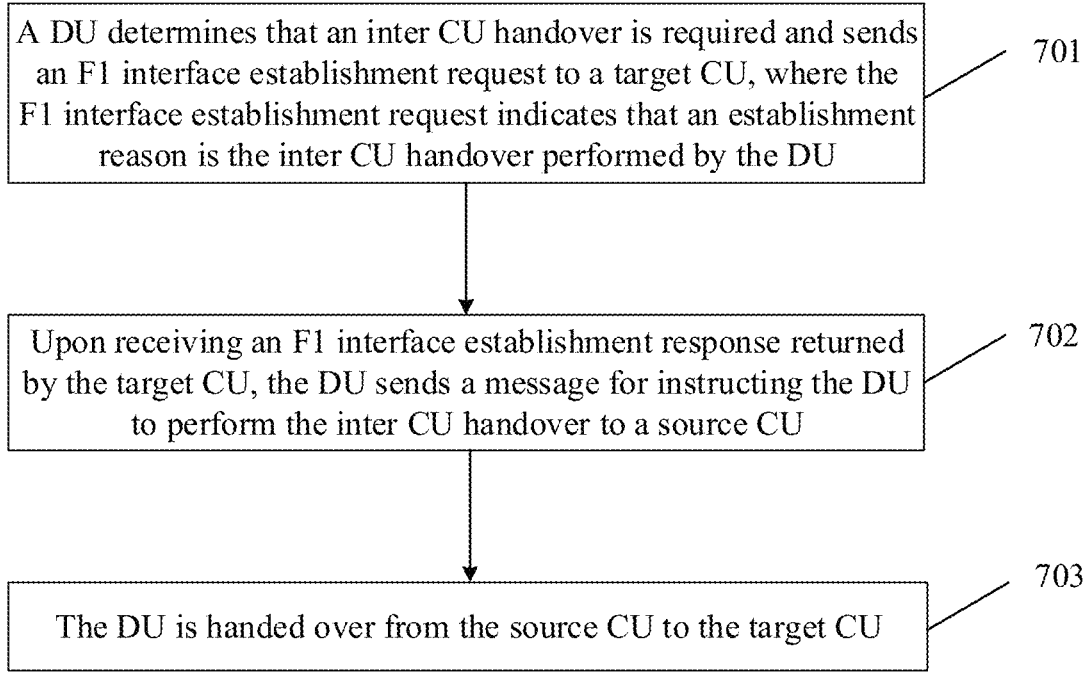
FIG. 7 is a schematic flowchart of a first handover method provided in an embodiment of the present disclosure.

FIG. 7 shows a handover method provided in an embodiment of the present disclosure. The method includes the following steps.

Step 701, a DU determines that an inter CU handover is required and sends an F1 interface establishment request to a target CU. The F1 interface establishment request indicates that an establishment cause is the inter CU handover performed on the DU.

Step 702, upon receiving an F1 interface establishment response returned by the target CU, the DU sends a message for instructing the DU to perform the inter CU handover to a source CU.

Step 703, the DU is handed over from the source CU to the target CU.

In one embodiment, the DU determining that the inter CU handover is required includes: the DU determining that the inter CU handover is required according to a received handover request sent by the source CU; or, the DU determining that the inter CU handover is required in response to satisfying a first handover triggering condition.

In one embodiment, the handover request carries information of the target CU; and after the DU determining that the inter CU handover is required according to the handover request, and before the DU sending the F1 interface establishment request to the target CU, the method further includes: the DU obtaining the information of the target CU from the handover request sent by the source CU.

In one embodiment, after the DU determining that the inter CU handover is required in response to satisfying the first handover triggering condition, and before the DU sending the F1 interface establishment request to the target CU, the method further includes: the DU determining information of the target CU on the basis of pre-configuration information.

In one embodiment, the DU sending a message for instructing the DU to perform the inter CU handover to the source CU includes: the DU sending a handover response message for instructing the DU to perform the inter CU handover to the source CU; or, the DU sending a handover instruction message for instructing the DU to perform the inter CU handover to the source CU.

In one embodiment, the DU being handed over from the source CU to the target CU includes: the DU receiving a UE context establishment request sent by the target CU, and a UE context modification request and an RRC reconfiguration message sent by the source CU, where the UE is a UE accessing the DU; the DU sending the RRC reconfiguration message to the UE; and upon receiving an RRC reconfiguration completion message returned by the UE, the DU sending the RRC reconfiguration completion message to the target CU, to enable the target CU to send a path handover request to a core network.

In one embodiment, the information of the target CU includes part or all of the following: an ID of the target CU; a name of the target CU; an address of a TNL of the target CU; or configuration information of OAM of the DU.

In one embodiment, after the DU receiving a UE context modification request sent by the source CU, the method further includes: the DU releasing a UE context at the source CU.

In one embodiment, the F1 interface establishment request is transmitted through part or all of the following: an RRC connection between a specific UE of the DU and the target CU; a laser link between the DU and the target CU; a microwave link between the DU and the target CU; or a wired connection between the DU and the target CU.

An embodiment of the present disclosure further provides a handover method. Since a source CU corresponding to the method is the source CU in the handover system in the embodiment of the present disclosure, and a principle of the method to solve problems is similar to that of the source CU, implementation of the method may refer to implementation of the system, and repetitions are not repeated herein.

Figure 8:
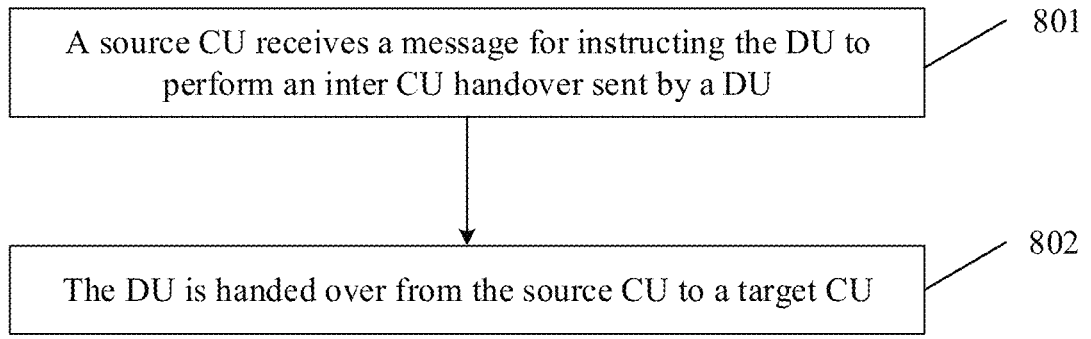
FIG. 8 is a schematic flowchart of a second handover method provided in an embodiment of the present disclosure.

FIG. 8 shows a handover method provided in an embodiment of the present disclosure. The method includes the following steps.

Step 801, a source CU receives a message sent by a DU and used for instructing the DU to perform an inter CU handover.

Step 802, the DU is handed over from the source CU to a target CU.

In one embodiment, the source CU receiving a message sent by a DU and used for instructing the DU to perform an inter CU handover includes: the source CU receiving a handover response message sent by the DU and used for instructing the DU to perform the inter CU handover; or, the source CU receiving a handover instruction message sent by the DU and used for instructing the DU to perform the inter CU handover.

In one embodiment, before the source CU receiving the handover response message sent by the DU and used for instructing the DU to perform the inter CU handover, the method further includes: the source CU determining that the DU is required to perform the inter CU handover in response to satisfying a second handover triggering condition; and the source CU sending a handover request to the DU, to enable the DU to determine that the inter CU handover is required.

In one embodiment, after the source CU receiving the message sent by a DU and used for instructing the DU to perform an inter CU handover, the method further includes: the source CU sending a handover request for applying for resources for a UE to the target CU, the UE being a UE accessing the DU; and upon receiving a handover request acknowledgement message returned by the target CU, the source CU sending a UE context modification request and an RRC reconfiguration message to the DU, to enable the DU to perform UE context modification and trigger the UE to perform RRC reconfiguration.

An embodiment of the present disclosure further provides a handover method. Since a target CU corresponding to the method is the target CU in the handover system in the embodiment of the present disclosure, and a principle of the method to solve problems is similar to that of the target CU, implementation of the method may refer to implementation of the system, and repetitions are not repeated herein.

Figure 9:
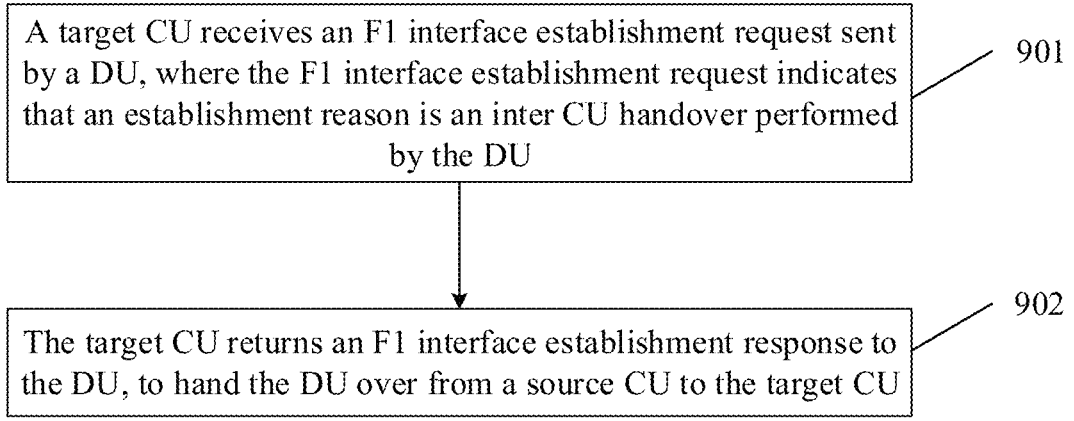
FIG. 9 is a schematic flowchart of a third handover method provided in an embodiment of the present disclosure.

FIG. 9 shows a handover method provided in an embodiment of the present disclosure. The method includes the following steps.

Step 901, a target CU receives an F1 interface establishment request sent by a DU. The F1 interface establishment request indicates that an establishment cause is an inter CU handover performed on the DU.

Step 902, the target CU returns an F1 interface establishment response to the DU, to hand the DU over from a source CU to the target CU.

In one embodiment, after the target CU returning an F1 interface establishment response to the DU, the method further includes: the target CU receiving a handover request sent by the source CU and used for applying for resources for a UE, the UE being a UE accessing the DU; the target CU sending a UE context establishment request to the DU and a handover request acknowledgement message to the source CU, to enable the DU to notify the UE of performing RRC reconfiguration; upon receiving an RRC reconfiguration completion message sent by the DU, the target CU sending a path handover request to a core network; and the target CU receiving a path handover request acknowledgement message returned by the core network.

In one embodiment, the F1 interface establishment request is transmitted through part or all of the following: an RRC connection between a specific UE of the DU and the target CU; a laser link between the DU and the target CU; a microwave link between the DU and the target CU; or a wired connection between the DU and the target CU.

An embodiment of the present disclosure further provides a DU for a handover. Since the DU is the DU in the method in the embodiment of the present disclosure, and a principle of the DU to solve problems is similar to that of the method, implementation of the DU may refer to implementation of the method, and repetitions are not repeated herein.

Figure 10:
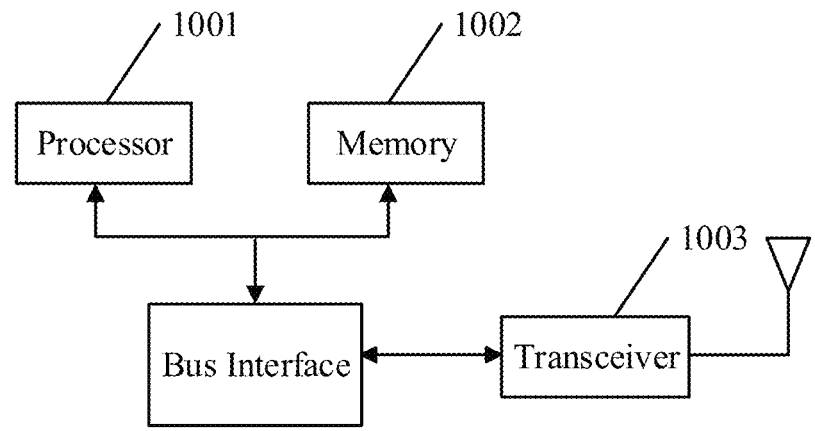
FIG. 10 is a schematic structural diagram of a first DU for a handover provided in an embodiment of the present disclosure.

FIG. 10 shows a DU for a handover provided in an embodiment of the present disclosure. The DU includes: a processor 1001, a memory 1002, and a transceiver 1003.

The processor 1001 is responsible for bus architecture management and general processing. The memory 1002 may store data used by the processor 1001 during operation execution. The transceiver 1003 is used for receiving and sending data under control of the processor 1001.

A bus architecture may include any number of interconnected buses and bridges. Specifically, various circuits of one or more processors 1001 represented by the processor 1001 and a memory represented by the memory 1002 are linked together. The bus architecture may also link various other circuits, such as peripheral devices, voltage regulators, and power management circuits, which are well known in the art, so they will not be further described herein. A bus interface provides an interface. The processor 1001 is responsible for bus architecture management and general processing. The memory 1002 may store data used by the processor 1001 during operation execution.

A flow disclosed in an embodiment of the present disclosure may be applied to the processor 1001 or realized by the processor 1001. In an implementation process, each step of a signal processing flow may be completed by a hardware integrated logic circuit in the processor 1001 or an instruction in the form of software. The processor 1001 may be a general-purpose processor 1001, a digital signal processor 1001, an application-specific integrated circuit, a field programmable gate array or other programmable logic devices, a discrete gate or transistor logic device, or a discrete hardware assembly, and may implement or execute the methods, steps, and logic diagrams disclosed in the embodiment of the present disclosure. The general-purpose processor 1001 may be a microprocessor 1001, or any conventional processor 1001. The steps of the method disclosed in connection with the embodiment of the present disclosure may be directly implemented by a hardware processor 1001, or by a combination of hardware and software modules in the processor 1001. The software module may be located in a random access memory, a flash memory, a read-only memory, a programmable read-only memory or an electrically erasable programmable memory, a register and other mature storage media in the field. The storage medium is located in the memory 1002, and the processor 1001 reads information from the memory 1002 and completes steps of the signal processing flow in combination with hardware.

The processor 1001 is used for reading programs in the memory 1002 and executing the following processes.

The processor 1001, the memory 1002, and the transceiver 1003.

The processor 1001 is used for reading programs in the memory, and executing: determining that an inter CU handover is required and sending an F1 interface establishment request to a target CU, the F1 interface establishment request indicating that an establishment cause is the inter CU handover performed on the DU; upon receiving an F1 interface establishment response returned by the target CU, sending a message for instructing the DU to perform the inter CU handover to a source CU; and handing the DU over from the source CU to the target CU.

In one embodiment, the processor 1001 may be used for: determining that the inter CU handover is required according to a received handover request sent by the source CU; or, determining that the inter CU handover is required when satisfying a first handover triggering condition.

In one embodiment, the handover request carries information of the target CU; and the processor 1001 is further used for: after the determining that the inter CU handover is required according to a handover request, and before the sending an F1 interface establishment request to a target CU, obtaining the information of the target CU from the handover request sent by the source CU.

In one embodiment, the processor 1001 is further used for: after the determining that the inter CU handover is required when satisfying a first handover triggering condition, and before the sending an F1 interface establishment request to a target CU, determining the information of the target CU on the basis of pre-configuration information.

In one embodiment, the processor 1001 may be used for: sending a handover response message for instructing the DU to perform the inter CU handover to the source CU; or sending a handover instruction message for instructing the DU to perform the inter CU handover to the source CU.

In one embodiment, the processor 1001 may be used for: receiving a UE context establishment request sent by the target CU, and a UE context modification request and an RRC reconfiguration message sent by the source CU, a UE being one accessing the DU; sending the RRC reconfiguration message to the UE; and upon receiving an RRC reconfiguration completion message returned by the UE, sending the RRC reconfiguration completion message to the target CU, to make the target CU send a path handover request to a core network.

In one embodiment, the information of the target CU includes part or all of the following: an ID of the target CU; a name of the target CU; an address of a TNL of the target CU; or configuration information of OAM of the DU.

In one embodiment, the processor 1001 is further used for: after receiving a UE context modification request sent by the source CU, releasing a UE context at the source CU.

In one embodiment, the F1 interface establishment request is transmitted through part or all of the following: an RRC connection between a specific UE of the DU and the target CU; a laser link between the DU and the target CU; a microwave link between the DU and the target CU; or a wired connection between the DU and the target CU.

An embodiment of the present disclosure further provides a source CU for a handover. Since the source CU is the source CU in the method in the embodiment of the present disclosure, and a principle of the source CU to solve problems is similar to that of the method, implementation of the source CU may refer to implementation of the method, and repetitions are not repeated herein.

Figure 11:
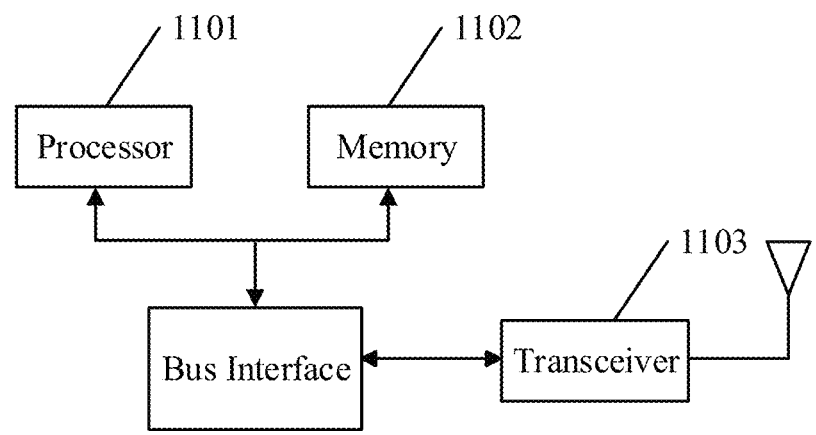
FIG. 11 is a schematic structural diagram of a first source CU for a handover provided in an embodiment of the present disclosure.

FIG. 11 shows a source CU for a handover provided in an embodiment of the present disclosure. The source CU includes: a processor 1101, a memory 1102, and a transceiver 1103.

The processor 1101 is responsible for bus architecture management and general processing. The memory 1102 may store data used by the processor 1101 during operation execution. The transceiver 1103 is used for receiving and sending data under control of the processor 1101.

A bus architecture may include any number of interconnected buses and bridges. Specifically, various circuits of one or more processors 1101 represented by the processor 1101 and a memory represented by the memory 1102 are linked together. The bus architecture may also link various other circuits, such as peripheral devices, voltage regulators, and power management circuits, which are well known in the art, so they will not be further described herein. A bus interface provides an interface. The processor 1101 is responsible for bus architecture management and general processing. The memory 1102 may store data used by the processor 1101 during operation execution.

A flow disclosed in an embodiment of the present disclosure may be applied to the processor 1101 or realized by the processor 1101. In an implementation process, each step of a signal processing flow may be completed by a hardware integrated logic circuit in the processor 1101 or an instruction in the form of software. The processor 1101 may be a general-purpose processor 1101, a digital signal processor 1101, an application-specific integrated circuit, a field programmable gate array or other programmable logic devices, a discrete gate or transistor logic device, or a discrete hardware assembly, and may implement or execute the methods, steps, and logic diagrams disclosed in the embodiment of the present disclosure. The general-purpose processor 1101 may be a microprocessor 1101, or any conventional processor 1101. The steps of the method disclosed in connection with the embodiment of the present disclosure may be directly implemented by a hardware processor 1101, or by a combination of hardware and software modules in the processor 1101. The software module may be located in a random access memory, a flash memory, a read-only memory, a programmable read-only memory or an electrically erasable programmable memory, a register and other mature storage media in the field. The storage medium is located in the memory 1102, and the processor 1101 reads information from the memory 1102 and completes steps of the signal processing flow in combination with hardware.

The processor 1101 is used for reading a program in the memory 1102 and executing the following processes: receiving a message sent by a DU and used for instructing the DU to perform an inter CU handover, to hand the DU over from the source CU to a target CU.

In one embodiment, the processor 1101 may be used for: receiving a handover response message sent by the DU and used for instructing the DU to perform the inter CU handover; or, receiving a handover instruction message sent by the DU and used for instructing the DU to perform the inter CU handover.

In one embodiment, the processor 1101 is further used for: before the receiving a handover response message sent by the DU and used for instructing the DU to perform the inter CU handover, determining that the DU is required to perform the inter CU handover when satisfying a second handover triggering condition; and sending a handover request to the DU, to make the DU determine that the inter CU handover is required.

In one embodiment, the processor 1101 is further used for: after the receiving a message sent by the DU and used for instructing the DU to perform the inter CU handover, sending a handover request for applying for resources for a UE to the target CU, the UE being one accessing the DU; and upon receiving a handover request acknowledgement message returned by the target CU, sending a UE context modification request and an RRC reconfiguration message to the DU, to make the DU perform UE context modification and trigger the UE to perform RRC reconfiguration.

An embodiment of the present disclosure further provides a CU for a handover. Since the CU is the CU in the method in the embodiment of the present disclosure, and a principle of the CU to solve problems is similar to that of the method, implementation of the CU may refer to implementation of the method, and repetitions are not repeated herein.

Figure 12:
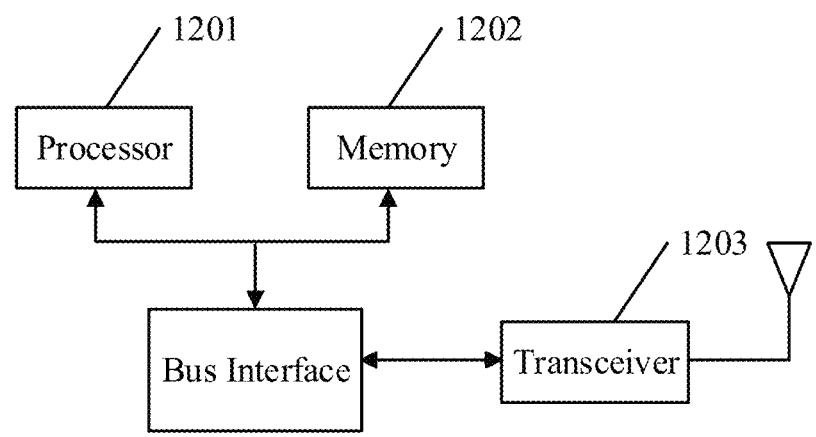
FIG. 12 is a schematic structural diagram of a first target CU for a handover provided in an embodiment of the present disclosure.

FIG. 12 shows a target CU for a handover provided in an embodiment of the present disclosure. The target CU includes: a processor 1201, a memory 1202, and a transceiver 1203.

The processor 1201 is responsible for bus architecture management and general processing. The memory 1202 may store data used by the processor 1201 during operation execution. The transceiver 1203 is used for receiving and sending data under control of the processor 1201.

A bus architecture may include any number of interconnected buses and bridges. Specifically, various circuits of one or more processors 1201 represented by the processor 1201 and a memory represented by the memory 1202 are linked together. The bus architecture may also link various other circuits, such as peripheral devices, voltage regulators, and power management circuits, which are well known in the art, so they will not be further described herein. A bus interface provides an interface. The processor 1201 is responsible for bus architecture management and general processing. The memory 1202 may store data used by the processor 1201 during operation execution.

A flow disclosed in an embodiment of the present disclosure may be applied to the processor 1201 or realized by the processor 1201. In an implementation process, each step of a signal processing flow may be completed by a hardware integrated logic circuit in the processor 1201 or an instruction in the form of software. The processor 1201 may be a general-purpose processor 1201, a digital signal processor 1201, an application-specific integrated circuit, a field programmable gate array or other programmable logic devices, a discrete gate or transistor logic device, or a discrete hardware assembly, and may implement or execute the methods, steps and logic diagrams disclosed in the embodiment of the present disclosure. The general-purpose processor 1201 may be a microprocessor 1201, or any conventional processor 1201. The steps of the method disclosed in connection with the embodiment of the present disclosure may be directly implemented by a hardware processor 1201, or by a combination of hardware and software modules in the processor 1201. The software module may be located in a random access memory, a flash memory, a read-only memory, a programmable read-only memory or an electrically erasable programmable memory, a register and other mature storage media in the field. The storage medium is located in the memory 1202, and the processor 1201 reads information from the memory 1202 and completes steps of the signal processing flow in combination with hardware.

The processor 1201 is used for reading a program from the memory 1202 and executing the following processes: receiving an F1 interface establishment request sent by a DU, the F1 interface establishment request indicating that an establishment cause is an inter CU handover performed on the DU; and returning an F1 interface establishment response to the DU, to hand the DU over from a source CU to the target CU.

In one embodiment, the processor 1201 is further used for: after the returning an F1 interface establishment response to the DU, receiving a handover request sent by the source CU and used for applying for resources for a UE, the UE being one accessing the DU; sending a UE context establishment request to the DU and a handover request acknowledgement message to the source CU, to make the DU ask the UE to perform RRC reconfiguration; upon receiving an RRC reconfiguration completion message sent by the DU, sending a path handover request to a core network; and receiving a path handover request acknowledgement message returned by the core network.

In one embodiment, the F1 interface establishment request is transmitted through part or all of the following: an RRC connection between a specific UE of the DU and the target CU; a laser link between the DU and the target CU; a microwave link between the DU and the target CU; or a wired connection between the DU and the target CU.

An embodiment of the present disclosure further provides a DU for a handover. Since the DU is the DU in the method in the embodiment of the present disclosure, and a principle of the DU to solve problems is similar to that of the method, implementation of the DU may refer to implementation of the method, and repetitions are not repeated herein.

Figure 13:
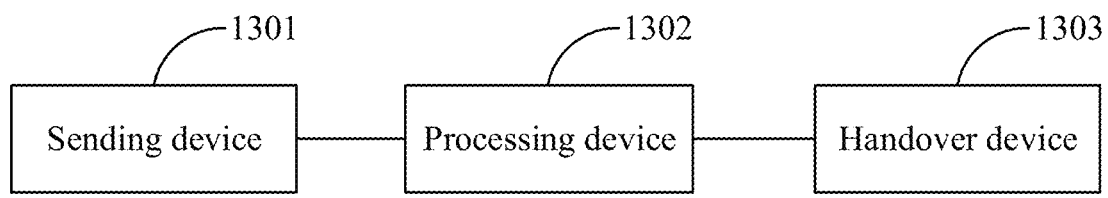
FIG. 13 is a schematic structural diagram of a second DU for a handover provided in an embodiment of the present disclosure.

FIG. 13 shows a DU for a handover provided in an embodiment of the present disclosure. The DU includes: a sending device 1301 for determining that an inter CU handover is required and sending an F1 interface establishment request to a target CU, the F1 interface establishment request indicating that an establishment cause is the inter CU handover performed on the DU; a processing device 1302 for upon receiving an F1 interface establishment response returned by the target CU, sending a message for instructing the DU to perform the inter CU handover to a source CU; and a handover device 1303 for handing the DU over from the source CU to the target CU.

In one embodiment, the processing device 1302 may be used for: determining that the inter CU handover is required according to a received handover request sent by the source CU; or determining that the inter CU handover is required when satisfying a first handover triggering condition.

In one embodiment, the handover request carries information of the target CU; and the processing device 1302 is further used for: after the determining that the inter CU handover is required according to a handover request, and before the sending an F1 interface establishment request to a target CU, obtaining the information of the target CU from the handover request sent by the source CU.

In one embodiment, the processing device 1302 is further used for: after the determining that the inter CU handover is required when satisfying a first handover triggering condition, and before the sending an F1 interface establishment request to a target CU, determining the information of the target CU on the basis of pre-configuration information.

In one embodiment, the processing device 1302 may be used for: sending a handover response message for instructing the DU to perform the inter CU handover to the source CU; or sending a handover instruction message for instructing the DU to perform the inter CU handover to the source CU.

In one embodiment, the processing device 1302 may be used for: receiving a UE context establishment request sent by the target CU, and a UE context modification request and an RRC reconfiguration message sent by the source CU, a UE being one accessing the DU; sending the RRC reconfiguration message to the UE; and upon receiving an RRC reconfiguration completion message returned by the UE, sending the RRC reconfiguration completion message to the target CU, to make the target CU send a path handover request to a core network.

In one embodiment, the information of the target CU includes part or all of the following: an ID of the target CU; a name of the target CU; an address of a TNL of the target CU; or configuration information of OAM of the DU.

In one embodiment, the processing device 1302 is further used for: after receiving a UE context modification request sent by the source CU, releasing a UE context at the source CU.

An embodiment of the present disclosure further provides a source CU for a handover. Since the source CU is the source CU in the method in the embodiment of the present disclosure, and a principle of the source CU to solve problems is similar to that of the method, implementation of the source CU may refer to implementation of the method, and repetitions are not repeated herein.

In one embodiment, an F1 interface establishment request is transmitted through part or all of the following: an RRC connection between a specific UE of a DU and a target CU; a laser link between the DU and the target CU; a microwave link between the DU and the target CU; or a wired connection between the DU and the target CU.

Figure 14:
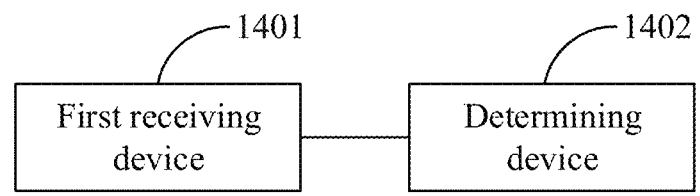
FIG. 14 is a schematic structural diagram of a second source CU for a handover provided in an embodiment of the present disclosure.

FIG. 14 shows a source CU for a handover provided in an embodiment of the present disclosure. The source CU includes: a first receiving device 1401 for receiving a message sent by a DU and used for instructing the DU to perform an inter CU handover, to hand the DU over from the source CU to a target CU.

In one embodiment, the first receiving device 1401 may be used for: receiving a handover response message sent by the DU and used for instructing the DU to perform the inter CU handover; or receiving a handover instruction message sent by the DU and used for instructing the DU to perform the inter CU handover.

In one embodiment, the CU further includes a determining device 1402; and the first receiving device 1401 is further used for before the receiving a handover response message sent by the DU and used for instructing the DU to perform the inter CU handover, and after the determining device 1402 satisfies a second handover triggering condition, determining that the DU is required to perform the inter CU handover; and sending a handover request to the DU, to make the DU determine that the inter CU handover is required.

In one embodiment, the first receiving device 1401 is further used for: after the receiving a message sent by the DU and used for instructing the DU to perform the inter CU handover, sending a handover request for applying for resources for a UE to the target CU, the UE being one accessing the DU; and upon receiving a handover request acknowledgement message returned by the target CU, sending a UE context modification request and an RRC reconfiguration message to the DU, to make the DU perform UE context modification and trigger the UE to perform RRC reconfiguration.

An embodiment of the present disclosure further provides a target CU for a handover. Since the target CU is the target CU in the method in the embodiment of the present disclosure, and a principle of the target CU to solve problems is similar to that of the method, implementation of the target CU may refer to implementation of the method, and repetitions are not repeated herein.

Figure 15:
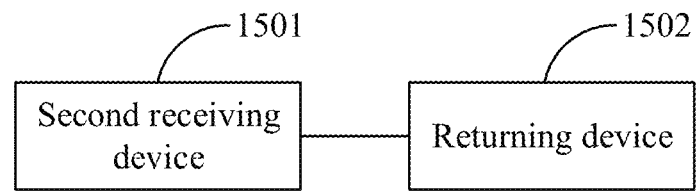
FIG. 15 is a schematic structural diagram of a second target CU for a handover provided in an embodiment of the present disclosure.

FIG. 15 shows a target CU for a handover provided in an embodiment of the present disclosure. The target CU includes: a second receiving device 1501 for receiving an F1 interface establishment request sent by a DU, the F1 interface establishment request indicating that an establishment cause is an inter CU handover performed on the DU; and a returning device 1502 for returning an F1 interface establishment response to the DU, to hand the DU over from a source CU to the target CU.

In one embodiment, the second receiving device 1501 is further used for: after the returning device 1502 returning an F1 interface establishment response to the DU, receiving a handover request sent by the source CU and used for applying for resources for a UE, the UE being one accessing the DU; sending a UE context establishment request to the DU, and a handover request acknowledgement message to the source CU, to make the DU ask the UE to perform RRC reconfiguration; upon receiving an RRC reconfiguration completion message sent by the DU, sending a path handover request to a core network; and receiving a path handover request acknowledgement message returned by the core network.

In one embodiment, the F1 interface establishment request is transmitted through part or all of the following: an RRC connection between a specific UE of the DU and the target CU; a laser link between the DU and the target CU; a microwave link between the DU and the target CU; or a wired connection between the DU and the target CU.

An embodiment of the present disclosure further provides a computer-readable nonvolatile storage medium that includes a program code. When run on a computing terminal, the program code is used for making the computing terminal execute the steps of the handover method of the embodiment of the present disclosure.

The present disclosure is described above with reference to block diagrams and/or flowcharts showing the methods, apparatuses (systems) and/or computer program products according to the embodiments of the present disclosure. It should be understood that a block of the block diagrams and/or flowcharts and combinations of blocks of the block diagrams and/or flowcharts may be implemented through computer program instructions. The computer program instructions may be provided for processors of a general-purpose computer and a special-purpose computer, and/or other programmable data processing apparatuses, to generate a machine, and instructions executed by the computer processor and/or other programmable data processing apparatuses create methods for implementing functions/actions specified in the block of the block diagrams and/or flowcharts.

Accordingly, the present disclosure may also be implemented by hardware and/or software (including firmware, resident software, microcode, etc.). Furthermore, the present disclosure may use a form of a computer program product on a computer-available or computer-readable storage medium, and the computer program product has a computer-available or computer-readable program code implemented in the medium, to be used by an instruction execution system or in combination with the instruction execution system. In the context of the present disclosure, the computer-available or computer-readable medium may be any medium, which may compass, store, communicate with, transmit or transfer a program, to be used by an instruction execution system, apparatus, or device, or in combination with the instruction execution system, apparatus, or device.

What is claimed is:

1. A handover method, comprising:
   determining, by a distributed unit (DU), that an inter central unit (CU) handover is required and sending an F1 interface establishment request to a target CU, wherein the F1 interface establishment request indicates that an establishment cause is the inter CU handover performed by the DU;
   upon receiving an F1 interface establishment response returned by the target CU, sending, by the DU, a message for instructing the DU to perform the inter CU handover, to a source CU; and
   the DU being handed over from the source CU to the target CU.

2. The method according to claim 1, wherein the determining, by the DU, that the inter CU handover is required, comprises:
   determining, by the DU, that the inter CU handover is required according to a received handover request sent by the source CU; or,
   determining, by the DU, that the inter CU handover is required in response to satisfying a first handover triggering condition.

3. The method according to claim 2, wherein the handover request carries information of the target CU; and
   after the DU determining that the inter CU handover is required according to the handover request, and before the DU sending the F1 interface establishment request to the target CU, the method further comprises:
   obtaining, by the DU, the information of the target CU from the handover request sent by the source CU.

4. The method according to claim 2, wherein after the DU determining that the inter CU handover is required in response to satisfying the first handover triggering condition, and before the DU sending the F1 interface establishment request to the target CU, the method further comprises:
  determining, by the DU, information of the target CU on the basis of pre-configuration information.

5. The method according to claim 1, wherein the sending, by the DU, a message for instructing the DU to perform the inter CU handover, to the source CU, comprises:
  sending, by the DU, a handover response message for instructing the DU to perform the inter CU handover to the source CU; or,
  sending, by the DU, a handover instruction message for instructing the DU to perform the inter CU handover to the source CU.

6. The method according to claim 1, wherein the DU being handed over from the source CU to the target CU, comprises:
  receiving, by the DU, a user equipment (UE) context establishment request sent by the target CU, and a UE context modification request and a radio resource control (RRC) reconfiguration message sent by the source CU, wherein the UE is a UE accessing the DU;
  sending, by the DU, the RRC reconfiguration message to the UE; and
  upon receiving an RRC reconfiguration completion message returned by the UE, sending by the DU, the RRC reconfiguration completion message to the target CU, to enable the target CU to send a path handover request to a core network;
  wherein information of the target CU comprises at least one of the following:
  an identity (ID) of the target CU;
  a name of the target CU;
  an address of a transport network layer (TNL) of the target CU; or
  configuration information of operation administration and maintenance (OAM) of the DU.

7. The method according to claim 6, wherein after the DU receiving a UE context modification request sent by the source CU, the method further comprises:
  releasing, by the DU, a UE context at the source CU.

8. The method according to claim 1, wherein the F1 interface establishment request is transmitted through at least one of the following:
  an RRC connection between a specific UE of the DU and the target CU;
  a laser link between the DU and the target CU;
  a microwave link between the DU and the target CU; or
  a wired connection between the DU and the target CU.

9. A handover method, comprising:
  receiving, by a source central unit (CU), a message for instructing a distributed unit (DU) to perform an inter CU handover sent by the DU, to hand the DU over from a source CU to a target CU.

10. The method according to claim 9, wherein the receiving, by the source CU, the message for instructing the DU to perform the inter CU handover sent by the DU, comprises:
  receiving, by the source CU, a handover response message for instructing the DU to perform the inter CU handover sent by the DU; or,
  receiving, by the source CU, a handover instruction message for instructing the DU to perform the inter CU handover sent by the DU;
  wherein before the source CU receiving the handover response message for instructing the DU to perform the inter CU handover sent by the DU, the method further comprises:
  determining, by the source CU, that the DU is required to perform the inter CU handover in response to satisfying a second handover triggering condition; and
  sending, by the source CU, a handover request to the DU, to enable the DU to determine that the inter CU handover is required.

11. The method according to claim 9, wherein after the source CU receiving the message for instructing the DU to perform the inter CU handover sent by a DU, the method further comprises:
  sending, by the source CU, a handover request for applying for resources for a user equipment (UE), to the target CU, wherein the UE is a UE accessing the DU; and
  upon receiving a handover request acknowledgement message returned by the target CU, sending, by the source CU, a UE context modification request and a radio resource control (RRC) reconfiguration message to the DU, to enable the DU to perform UE context modification and trigger the UE to perform RRC reconfiguration.

12. A handover method, comprising:
  receiving, by a target central unit (CU), an F1 interface establishment request sent by a distributed unit (DU), wherein the F1 interface establishment request indicates that an establishment cause is an inter CU handover performed by the DU; and
  returning, by the target CU, an F1 interface establishment response, to the DU, to hand the DU over from a source CU to the target CU.

13. The method according to claim 12, wherein after the target CU returning the F1 interface establishment response to the DU, the method further comprises:
  receiving, by the target CU, a handover request for applying for resources for a user equipment (UE), sent by the source CU, wherein the UE is a UE accessing the DU;
  sending, by the target CU, a UE context establishment request to the DU and a handover request acknowledgement message to the source CU, to enable the DU to notify the UE of performing radio resource control (RRC) reconfiguration;
  upon receiving an RRC reconfiguration completion message sent by the DU, sending, by the target CU, a path handover request to a core network; and
  receiving, by the target CU, a path handover request acknowledgement message returned by the core network;
  wherein the F1 interface establishment request is transmitted through at least one of the following:
  an RRC connection between a specific UE of the DU and the target CU;
  a laser link between the DU and the target CU;
  a microwave link between the DU and the target CU; or
  a wired connection between the DU and the target CU.

14. A distributed unit (DU) for a handover, comprising: a processor, a memory, and a transceiver, wherein
  the processor is configured for reading programs in the memory, and executing the method of claim 1.

15. The DU according to claim 14, wherein the processor is further configured for:

determining that the inter CU handover is required according to a received handover request sent by the source CU; or, determining that the inter CU handover is required in response to satisfying a first handover triggering condition;

wherein the handover request carries information of the target CU; and the processor is further configured for:

after the determining that the inter CU handover is required according to the handover request, and before the sending the F1 interface establishment request to the target CU, obtaining the information of the target CU from the handover request sent by the source CU;

wherein the processor is further configured for:

after the determining that the inter CU handover is required in response to satisfying the first handover triggering condition, and before the sending the F1 interface establishment request to the target CU, determining information of the target CU on the basis of pre-configuration information.

16. The DU according to claim 14, wherein the processor is further configured for:

sending a handover response message for instructing the DU to perform the inter CU handover to the source CU; or sending a handover instruction message for instructing the DU to perform the inter CU handover to the source CU;

wherein the processor is further configured for:

after receiving a UE context modification request sent by the source CU, releasing a UE context at the source CU.

17. The DU according to claim 14, wherein the processor is further configured for:

receiving a user equipment (UE) context establishment request sent by the target CU, and a UE context modification request and a radio resource control (RRC) reconfiguration message sent by the source CU, wherein the UE is a UE accessing the DU;

sending the RRC reconfiguration message to the UE; and upon receiving an RRC reconfiguration completion message returned by the UE, sending the RRC reconfiguration completion message to the target CU, to enable the target CU to send a path handover request to a core network.

18. A source central unit (CU) for a handover, comprising: a processor, a memory, and a transceiver, wherein the processor is configured for reading programs in the memory, and executing the method of claim 9.

19. The source CU according to claim 18, wherein the processor is further configured for:

receiving a handover response message for instructing the DU to perform the inter CU handover, sent by the DU; or, receiving a handover instruction message for instructing the DU to perform the inter CU handover sent by the DU;

wherein the processor is further configured for:

before the receiving the handover response message for instructing the DU to perform the inter CU handover sent by the DU, determining that the DU is required to perform the inter CU handover in response to satisfying a second handover triggering condition; and sending a handover request to the DU, to enable the DU to determine that the inter CU handover is required;

wherein the processor is further configured for:

after the receiving the message for instructing the DU to perform the inter CU handover sent by the DU, sending a handover request for applying for resources for a user equipment (UE) to the target CU, wherein the UE is a UE accessing the DU; and upon receiving a handover request acknowledgement message returned by the target CU, sending a UE context modification request and a radio resource control (RRC) reconfiguration message to the DU, to enable the DU to perform UE context modification and trigger the UE to perform RRC reconfiguration.

20. A target central unit (CU) for a handover, comprising: a processor, a memory, and a transceiver, wherein the processor is configured for reading programs in the memory, and executing the method of claim 12.

* * * * *